US012676299B2

(12) United States Patent
Fujimoto

(10) Patent No.: US 12,676,299 B2
(45) Date of Patent: Jul. 7, 2026

(54) NONAQUEOUS ELECTROLYTE SECONDARY BATTERY

(71) Applicant: Panasonic Intellectual Property Management Co., Ltd., Osaka (JP)

(72) Inventor: Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 697 days.

(21) Appl. No.: 17/728,982

(22) Filed: Apr. 26, 2022

(65) Prior Publication Data

US 2022/0255054 A1     Aug. 11, 2022

Related U.S. Application Data

(63) Continuation of application No. PCT/JP2020/016985, filed on Apr. 20, 2020.

(30) Foreign Application Priority Data

Nov. 22, 2019     (JP) .................................. 2019-211854

(51) Int. Cl.
  *H01M 4/134* (2010.01)
  *H01M 10/0569* (2010.01)
  *H01M 4/02* (2006.01)

(52) U.S. Cl.
  CPC ....... *H01M 4/134* (2013.01); *H01M 10/0569* (2013.01); *H01M 2004/027* (2013.01); *H01M 2300/0028* (2013.01)

(58) Field of Classification Search
  CPC ........ H01M 4/42; H01M 4/405; H01M 4/134; H01M 2004/027
  See application file for complete search history.

(56) References Cited

U.S. PATENT DOCUMENTS

| | | | |
|---|---|---|---|
| 6,051,340 A * | 4/2000 | Kawakami .............. | H01M 4/40 429/231.95 |
| 2004/0048160 A1 | 3/2004 | Omaru | |
| 2011/0236758 A1 | 9/2011 | Takahashi et al. | |
| 2013/0309575 A1 | 11/2013 | Takahashi et al. | |

(Continued)

FOREIGN PATENT DOCUMENTS

| | | |
|---|---|---|
| CN | 102201564 A | 9/2011 |
| JP | 2002-042889 | 2/2002 |

(Continued)

OTHER PUBLICATIONS

'Anode Materials for Lithium Ion Batteries in Li—Zn—P Systems'. Ionics 11. 2005. p. 66-75 (Year: 2005).*

(Continued)

*Primary Examiner* — Stephen J Yanchuk
(74) *Attorney, Agent, or Firm* — WHDA, LLP

(57)     ABSTRACT

A nonaqueous electrolyte secondary battery includes a positive electrode capable of occluding and releasing lithium, a negative electrode including a negative electrode current collector and a negative electrode active material, and an electrolyte solution including a solvent. In the nonaqueous electrolyte secondary battery, the negative electrode active material includes metal zinc or an alloy of metal zinc. The solvent is composed only of vinylene carbonate.

5 Claims, 3 Drawing Sheets

(56) References Cited

U.S. PATENT DOCUMENTS

| | | | | |
|---|---|---|---|---|
| 2016/0056490 | A1* | 2/2016 | Chiang | H01M 4/62 |
| | | | | 429/104 |
| 2018/0277903 | A1* | 9/2018 | Xu | H01M 4/5825 |
| 2018/0366778 | A1* | 12/2018 | Liu | H01M 10/0562 |

FOREIGN PATENT DOCUMENTS

| | | | |
|---|---|---|---|
| JP | 2004-103476 | | 4/2004 |
| JP | 2004-253305 | | 9/2004 |
| JP | 2010-097761 | | 4/2010 |
| WO | 2012/029401 | | 3/2012 |
| WO | WO-2012029401 A1 * | 3/2012 | H01M 10/0525 |

OTHER PUBLICATIONS

English Translation of CN102201564 (Year: 2011).*
Qian et al. [âInvestigation on the electrochemical decomposition of the electrolyte additive vinylene carbonate in Li metal half cells and lithium ion full cellsâ. Journal of Power Sources 332 (2016) 60-71] (Year: 2016).*
International Search Report of PCT application No. PCT/JP2020/016985 dated Jun. 30, 2020.
English Translation of Chinese Search Report dated Oct. 12, 2024 for the related Chinese Patent Application No. 202080079522.9.

\* cited by examiner

NONAQUEOUS ELECTROLYTE SECONDARY BATTERY

BACKGROUND

1. Technical Field

The present disclosure relates to a nonaqueous electrolyte secondary battery.

2. Description of the Related Art

There has been extensive research and development of lithium secondary batteries. The battery characteristics, such as charge and discharge voltages, charge-discharge cycle characteristics, and storage characteristics, of a lithium secondary battery significantly vary by the electrodes included in the lithium secondary battery. There have been attempts to enhance battery characteristics by improving an electrode active material.

Japanese Unexamined Patent Application Publication Nos. 2004-103476, 2002-042889, 2004-253305, and 2010-097761 and International Publication No. 2012/029401 disclose a nonaqueous electrolyte battery that includes a negative electrode active material including a metallic element capable of alloying with lithium. Such a negative electrode active material may enhance battery characteristics, such as capacity and cycle characteristics.

SUMMARY

In one general aspect, the techniques disclosed here feature a nonaqueous electrolyte secondary battery that includes a positive electrode capable of occluding and releasing lithium; a negative electrode including a negative electrode current collector and a negative electrode active material; and an electrolyte solution including a solvent. The negative electrode active material includes metal zinc or an alloy of metal zinc. The solvent is composed only of vinylene carbonate.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
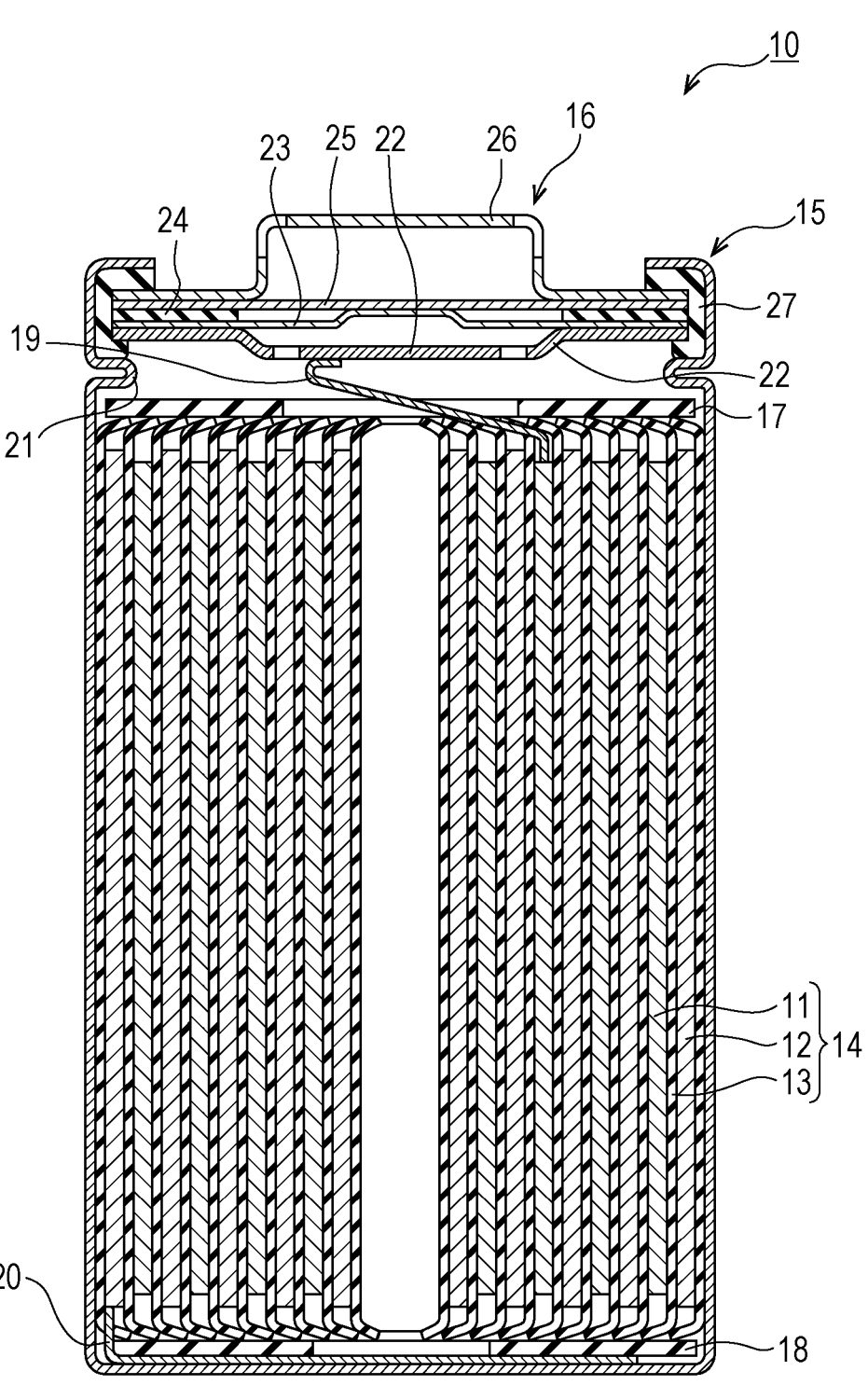
FIG. 1 is a longitudinal cross-sectional view of a nonaqueous electrolyte secondary battery according to an exemplary embodiment of the present disclosure.

Underlying Knowledge Forming Basis of the Present Disclosure

Using aluminum, silicon, or tin, which is capable of electrochemically alloying with lithium during charging, as a negative electrode active material in order to increase the capacity of a lithium secondary battery has been proposed. Lithium alloys have a high capacity density. Among these, a lithium-silicon alloy has a particularly high theoretical capacity density. Therefore, a lithium secondary battery that includes a negative electrode including a material capable of alloying with lithium has a high capacity. Thus, a lithium alloy is a promising negative electrode active material. Various lithium secondary batteries that include a negative electrode including a material capable of alloying with lithium have been proposed.

A negative electrode that includes a metal capable of alloying with lithium expands and contracts upon occluding and releasing lithium, respectively. The repeated expansion and contraction of the negative electrode which occurs during charging and discharging may disadvantageously cause the pulverization of a lithium alloy, which serves as a negative electrode active material. The pulverization of the lithium alloy may result in the degradation of the current collection characteristics of the negative electrode. The degradation of the above current collection characteristics makes it impossible to achieve sufficient cycle characteristics. In order to address the above issues, a thin-film composed of a metal capable of alloying with lithium, such as silicon or tin, may be formed on the current collector so as to come into intimate contact with the current collector. This may limit the degradation of the current collection characteristics of the negative electrode, which may be caused by the repeated expansion and contraction of the negative electrode due to the occlusion and release of lithium. However, it is difficult to limit the degradation of the current collection characteristics of the negative electrode to a sufficient degree only by using the thin-film composed of a metal capable of alloying with lithium.

Forming a metal thin-film by sputtering or vapor deposition is not advantageous in practical applications because it increases the production costs. Plating is advantageous because it reduces the production costs. However, it is considerably difficult to perform plating using silicon. Although it is easy to perform plating using tin, tin may reduce the energy density of a battery since tin has a high discharge potential. Examples of a metal which is capable of alloying with lithium, with which plating can be easily performed, and which has a low discharge potential include zinc, cadmium, and mercury. Among these, only zinc may be used in practical applications in consideration of toxicity.

Since zinc has a considerably low discharge potential (0.2 V vs Li/Li$^+$), the reductive decomposition of an electrolyte solution is likely to occur. Therefore, even when a certain current collection property is achieved using a thin-film composed of zinc, suitable cycle characteristics may fail to be achieved unless an appropriate electrolyte solution is selected. Since an electrolyte solution needs to be resistant to oxidative decomposition on the positive electrode even at high potentials, the electrolyte solution needs to be resistant to both oxidation and reduction. While only carbonate ester solvents have the above-described property (i.e., resistance), some of the carbonate esters may be reduced at a low potential (0.2 V vs Li/Li⁺).

The inventor of the present invention conducted extensive studies in order to address the above-described issues and consequently devised the nonaqueous electrolyte secondary battery according to the present disclosure, which is described below.

Summary of Aspects of Present Disclosure

An nonaqueous electrolyte secondary battery according to a first aspect of the present disclosure includes:

a positive electrode capable of occluding and releasing lithium;

a negative electrode including a negative electrode current collector and a negative electrode active material; and an electrolyte solution including a solvent.

The negative electrode active material includes zinc, and the solvent is composed only of vinylene carbonate.

Since the nonaqueous electrolyte secondary battery according to the first aspect includes an electrolyte solution including a solvent composed only of vinylene carbonate, a dense coating film is formed on the surface of the negative electrode as a result of the reduction of vinylene carbonate. The above coating film may increase the adhesion between the negative electrode current collector and the negative electrode active material. This enables certain current collection characteristics to be maintained even after repeated cycles of charging and discharging. Thus, the cycle characteristics of the nonaqueous electrolyte secondary battery according to the first aspect may be enhanced.

According to a second aspect of the present disclosure, for example, in the nonaqueous electrolyte secondary battery according to the first aspect, the negative electrode may include a film disposed on the negative electrode current collector, and the film may include the metal zinc, which is the negative electrode active material. Since zinc, which serves as a negative electrode active material, is included in the thin-film disposed on the negative electrode current collector, the adhesion between zinc and the negative electrode current collector is further increased. This enhances the current collection characteristics. Thus, the cycle characteristics of the nonaqueous electrolyte secondary battery according to the second aspect may be further enhanced.

According to a third aspect of the present disclosure, for example, in the nonaqueous electrolyte secondary battery according to the first or second aspect, the negative electrode active material may include at least one lithium-zinc alloy selected from the group consisting of $Li_2Zn_3$, $LiZn_2$, $Li_2Zn_5$, $LiZn_4$, and $LiZn$ during charging.

According to the third aspect, a nonaqueous electrolyte secondary battery having improved cycle characteristics may be produced.

A nonaqueous electrolyte secondary battery according to an exemplary embodiment of the present disclosure is described below. The present disclosure is not limited by the exemplary embodiment below.

EXEMPLARY EMBODIMENT

FIG. 1 is a schematic longitudinal cross-sectional view of a nonaqueous electrolyte secondary battery 10 according to an exemplary embodiment of the present disclosure. As illustrated in FIG. 1, the nonaqueous electrolyte secondary battery 10 is a cylindrical battery that includes a cylindrical battery casing, a wound electrode group 14, and an electrolyte solution (not illustrated). The electrode group 14 is disposed in the battery casing and arranged in contact with the electrolyte solution.

The battery casing is constituted by a casing main body 15 that is a closed-end cylindrical metal container and a sealing plate 16 with which the opening of the casing main body 15 is sealed. A gasket 27 is interposed between the casing main body 15 and the sealing plate 16. The gasket 27 enables the battery casing to be hermetically sealed. In the casing main body 15, insulating plate 17 and 18 are disposed at the respective ends of the electrode group 14 in the direction of the axis around which the electrode group 14 is wound (hereinafter, this axis is referred to as "winding axis").

The casing main body 15 includes, for example, a step 21. The step 21 may be formed by pressing a portion of the side wall of the casing main body 15 from the outside of the casing main body 15. The step 21 may be formed on the side wall of the casing main body 15 in a circular shape in the circumferential direction of a virtual circle defined by the casing main body 15. In such a case, the sealing plate 16 is supported by, for example, the opening-side surface of the step 21.

The sealing plate 16 includes a filter 22, a lower valve plate 23, an insulating member 24, an upper valve plate 25, and a cap 26, which are stacked on top of one another in this order. The sealing plate 16 is attached to the opening of the casing main body 15 such that the cap 26 is located on the outer side of the casing main body 15 and the filter 22 is located on the inner side of the casing main body 15.

Each of the above components of the sealing plate 16 may have, for example, a disc-like shape or a ring-like shape. The above-described components other than the insulating member 24 are electrically connected to one another.

The electrode group 14 includes a positive electrode 11, a negative electrode 12, and a separator 13. The positive electrode 11, the negative electrode 12, and the separator 13 are all band-like. For example, the transverse directions of the band-like positive electrode 11 and negative electrode 12 are parallel to the winding axis of the electrode group 14. The separator 13 is interposed between the positive electrode 11 and the negative electrode 12. The positive electrode 11 and the negative electrode 12 are wound into a spiral with the separator 13 being interposed between the two electrodes.

When a cross section of the nonaqueous electrolyte secondary battery 10 which is orthogonal to the winding axis of the electrode group 14 is observed, the positive electrode 11 and the negative electrode 12 are alternately stacked on top of each other in the radial direction of a virtual circle defined by the casing main body 15 with the separator 13 being interposed between the two electrodes.

The positive electrode 11 is electrically connected to the cap 26, which serves also as a positive terminal, with a positive electrode lead 19. An end of the positive electrode lead 19 is connected to, for example, a portion of the positive electrode 11 which is in the vicinity of the center of the positive electrode 11 in the longitudinal direction. The positive electrode lead 19 extends from the positive electrode 11 to the filter 22 through a through-hole formed in the insulating plate 17. The other end of the positive electrode lead 19 is, for example, welded to a surface of the filter 22 which faces the electrode group 14.

The negative electrode 12 is electrically connected to the casing main body 15, which serves also as a negative terminal, with a negative electrode lead 20. An end of the negative electrode lead 20 is connected to, for example, an end of the negative electrode 12 in the longitudinal direction.

The other end of the negative electrode lead 20 is, for example, welded to the inner bottom of the casing main body 15.

Each of the components of the nonaqueous electrolyte secondary battery 10 is specifically described below.

Positive Electrode 11

The positive electrode 11 is capable of occluding and releasing lithium. The positive electrode 11 may include a positive electrode current collector and a positive electrode active material layer. The positive electrode active material layer is, for example, disposed on the positive electrode current collector. The positive electrode active material layer is, for example, disposed on the surface of the positive electrode current collector so as to come into direct contact with the positive electrode current collector. The positive electrode current collector and the positive electrode active material layer are, for example, band-like. The positive electrode current collector has, for example, a pair of principal surfaces opposite to each other. The term "principal surface" used herein refers to a surface of the positive electrode current collector which has the largest area. In the positive electrode 11, two positive electrode active material layers may be disposed on the respective principal surfaces of the positive electrode current collector. Note that, in the positive electrode 11, one positive electrode active material layer may be disposed on only one of the principal surfaces of the positive electrode current collector. The positive electrode active material layer may be disposed on only one of the principal surfaces of the positive electrode current collector in at least one selected from the group consisting of a region of the positive electrode 11 which is connected to the positive electrode lead 19 and a region of the positive electrode 11 which does not face the negative electrode 12.

The positive electrode current collector may be any of the positive electrode current collectors included in the nonaqueous electrolyte secondary batteries known in the related art. Examples of the material constituting the positive electrode current collector include metal materials, such as copper, stainless steel, iron, and aluminum.

The positive electrode active material layer is a layer that includes a positive electrode active material. The positive electrode active material is a material capable of occluding and releasing lithium. Examples of the positive electrode active material include a transition metal oxide, a fluoride, a polyanion, a fluorinated polyanion, a transition metal sulfide, and a phosphate having an olivine structure. Examples of the transition metal oxide include $LiCoO_2$, $LiNiO_2$, and $Li_2Mn_2O_4$. Examples of the above phosphate include $LiFePO_4$, $LiNiPO_4$, and $LiCoPO_4$. The positive electrode active material layer may include a plurality of positive electrode active materials.

The positive electrode active material layer may optionally include a conductive agent, an ionic conductor, and a binder as needed.

The conductive agent and the ionic conductor are used for reducing the resistance of the positive electrode 11.

Examples of the conductive agent include the following:
(i) carbon materials, such as carbon black, graphite, acetylene black, carbon nanotubes, carbon nanofibers, graphene, fullerene, and graphite oxide; and
(ii) conductive polymers, such as polyaniline, polypyrrole, and polythiophene.

Examples of the ionic conductor include the following:
(i) gel electrolytes, such as polymethyl methacrylate;
(ii) organic solid electrolytes, such as polyethylene oxide; and
(iii) inorganic solid electrolytes, such as $Li_7La_3Zr_2O_{12}$.

The binder is used for enhancing the binding property of the material constituting the positive electrode 11. Examples of the binder include polymeric materials, such as polyvinylidene fluoride, a vinylidene fluoride-hexafluoropropylene copolymer, a vinylidene fluoride-tetrafluoroethylene copolymer, polytetrafluoroethylene, carboxymethyl cellulose, polyacrylic acid, a styrene-butadiene copolymer rubber, polypropylene, polyethylene, and polyimide.

The positive electrode 11 may be composed of lithium metal. Using lithium metal as a positive electrode makes it easy to control the dissolution and precipitation as a metal positive electrode.

Negative Electrode 12

The negative electrode 12 includes a negative electrode current collector and a negative electrode active material. The negative electrode active material may be a material capable of reversibly occluding and releasing lithium. The negative electrode active material includes zinc. The zinc included as a negative electrode active material may be zinc metal or a zinc alloy. Examples of the zinc alloy include an alloy including at least one metallic element selected from the group consisting of transition metals. The transition metal may be at least one selected from the group consisting of iron, manganese, and titanium. The zinc alloy may be a zinc-iron alloy, a zinc-manganese alloy, or a zinc-titanium alloy.

Zinc is a metal capable of alloying with lithium. Occlusion of lithium occurs when zinc alloys with lithium during charging. That is, a lithium-zinc alloy is formed in the negative electrode 12 while the nonaqueous electrolyte secondary battery 10 is charged. The above lithium-zinc alloy includes at least one selected from the group consisting of $Li_2Zn_3$, $LiZn_2$, $Li_2Zn_5$, $LiZn_4$, and $LiZn$. After the lithium-zinc alloy has released lithium during discharging, the lithium-zinc alloy is restored to metal zinc.

The negative electrode active material may include a material other than zinc as an active material. Examples of the material other than zinc include carbon materials, such as graphite. The negative electrode active material may be composed only of zinc.

The negative electrode active material is included in, for example, a negative electrode active material layer included in the negative electrode 12. The negative electrode active material layer is a layer that includes the negative electrode active material. The negative electrode active material layer is, for example, disposed on the negative electrode current collector. The negative electrode active material layer is, for example, disposed on the surface of a plate- or foil-like negative electrode current collector so as to come into direct contact with the negative electrode current collector. The negative electrode current collector and the negative electrode active material layer are, for example, band-like. The negative electrode current collector has, for example, a pair of principal surfaces opposite to each other. The term "principal surface" used herein refers to a surface of the negative electrode current collector which has the largest area. Specifically, the plate-like negative electrode current collector has front and rear principal surfaces. In the negative electrode 12, the negative electrode active material layer may be disposed on each of the principal surfaces of the negative electrode current collector. That is, the negative electrode active material layer may be disposed on the front and rear principal surfaces of the negative electrode current collector. In the negative electrode 12, the negative electrode active material layer may be disposed on only one of the principal surfaces of the negative electrode current collector. In other words, the negative electrode active material layer may be disposed on only one of the front and rear principal surfaces of the negative electrode current collector. The negative electrode active material layer may be disposed on only one of the principal surfaces of the negative electrode current collector in at least one selected from the group consisting of a region of the negative electrode 12 which is connected to the negative electrode lead 20 and a region of the negative electrode 12 which does not face the positive electrode 11.

The negative electrode active material layer is, for example, a thin-film disposed on the negative electrode current collector. The thin-film includes zinc that serves as a negative electrode active material. That is, in this embodiment, the negative electrode 12 may include a thin-film disposed on the negative electrode current collector, the thin-film including zinc and serving as a negative electrode active material layer. The thickness of the thin-film including zinc may be equal to or greater than 0.1 μm and equal to or less than 100 μm. The negative electrode active material layer may be a thin-film composed of zinc. In the case where the thin-film including the negative electrode active material is disposed on the negative electrode current collector, the negative electrode current collector and the negative electrode active material are brought into intimate contact with each other. This enables the degradation of current collection characteristics to be limited even when the negative electrode active material repeatedly expands and contracts due to the occlusion and release of lithium. Thus, forming a negative electrode active material layer including the negative electrode active material on the negative electrode current collector may enhance the cycle characteristics of the nonaqueous electrolyte secondary battery 10.

The negative electrode active material layer may optionally include a conductive agent, an ionic conductor, and a binder as needed. The above-described materials that can be used as a conductive agent, an ionic conductor, or a binder for the positive electrode active material layer can be also used for the negative electrode active material layer.

The negative electrode current collector is commonly formed of a conductive sheet. The material constituting the negative electrode current collector may be a metal material, such as a metal or an alloy. The above metal material may be a material that is unreactive or weakly reactive with lithium. Examples of such a material include a material that is unreactive with at least one selected from the group consisting of lithium metal and a lithium ion. Specifically, the metal material may be a material that forms neither an alloy nor an intermetallic compound when combined with lithium. Examples of such a metal material include copper, nickel, iron, and alloys including the above metallic elements. Examples of the alloys include a copper alloy and a stainless steel. The negative electrode current collector may include at least one selected from the above metal materials. The negative electrode current collector may include a conductive material other than the metal material.

Examples of the shape of the negative electrode current collector include a foil and a film. The negative electrode current collector may be porous. The negative electrode current collector may be a metal foil in order to increase electrical conductivity. The negative electrode current collector may be a metal foil including copper. Examples of the metal foil including copper include a copper foil and a copper alloy foil. The copper content in the metal foil may be equal to or greater than 50% by mass or may be equal to or greater than 80% by mass. In particular, the metal foil may be a copper foil that substantially includes copper only as a metal. The thickness of the negative electrode current collector is, for example, equal to or greater than 5 μm and equal to or less than 20 μm.

Separator 13

The separator 13 has, for example, ionic permeability and an insulation property. The separator 13 is a porous sheet or the like. Examples of the separator 13 include a microporous film, a woven fabric, and a nonwoven fabric. The material constituting the separator 13 is not limited and may be a polymeric material.

Examples of the polymeric material include an olefin resin, a polyamide resin, and cellulose. The olefin resin may include a polymer that includes at least one selected from the group consisting of ethylene and propylene as a monomer unit. The above polymer may be either a homopolymer or a copolymer. Examples of the polymer include polyethylene and polypropylene.

The separator 13 may further include, in addition to the polymeric material, an additive as needed. Examples of the additive include an inorganic filler.

Electrolyte Solution

The electrolyte solution includes a solvent. The solvent is composed only of vinylene carbonate. Since the ring constituting vinylene carbonate includes a double bond, vinylene carbonate can be easily polymerized. Thus, vinylene carbonate is polymerized on the negative electrode 12 upon being reduced. As a result of the polymerization of vinylene carbonate upon reduction, a dense coating film composed of a polymer of vinylene carbonate is formed on the negative electrode 12. This coating film increases the adhesion between the negative electrode current collector and the negative electrode active material. This enables certain current collection characteristics to be maintained even after repeated cycles of charging and discharging. Since the coating film has certain elasticity, the adhesion between the negative electrode current collector and the negative electrode active material can be maintained at a sufficient level even when the negative electrode active material repeatedly expands and contracts during charging and discharging. This may enhance the cycle characteristics of the nonaqueous electrolyte secondary battery 10.

When vinylene carbonate is reduced while a lithium salt is present in the electrolyte solution, a polymer of vinylene carbonate which includes the lithium salt is formed. A coating film composed of the polymer including a lithium salt has lithium ion conductivity. Covering the surface of the negative electrode 12 with the coating film composed of the above polymer may suppress further reduction of vinylene carbonate. The reaction in which lithium is occluded into the negative electrode active material occurs in the above-described manner.

As described above, the coating film composed of the above polymer enables the adhesion between the negative electrode current collector and the negative electrode active material to be maintained at a sufficient level without inhibiting the reaction in which lithium is occluded into the negative electrode active material. Consequently, the nonaqueous electrolyte secondary battery 10 may have excellent cycle characteristics.

If the electrolyte solution further includes a solvent other than vinylene carbonate, the resulting polymer includes at least one selected from the group consisting of the solvent other than vinylene carbonate and the product of decomposition of the solvent other than vinylene carbonate. In such a case, the surface of the negative electrode 12 may fail to be covered with a coating film composed of the polymer to a sufficient degree and, consequently, it becomes impossible to increase the adhesion between the negative electrode current collector and the negative electrode active material to a sufficient degree. As a result, cycle characteristics may become degraded when the negative electrode active material repeatedly expands and contracts during charging and discharging. Therefore, it is essential to use a solvent composed only of vinylene carbonate as a solvent for the electrolyte solution.

The electrolyte solution may include an electrolyte salt. Examples of the electrolyte salt include lithium salts, such as $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, $LiClO_4$, and lithium bis(oxalate)borate. The above electrolyte salts may be used alone or in combination of two or more. The electrolyte solution may include lithium dissolved therein.

The concentration of the electrolyte salt in the electrolyte solution is not limited. The electrolyte salt may be dissolved in vinylene carbonate at a concentration of, for example, equal to or greater than 0.1 mol/L and equal to or less than 3.0 mol/L.

The lithium ions included in the electrolyte solution may be lithium ions derived from the lithium salt added to the electrolyte solution or lithium ions fed from the positive electrode 11 as a result of charging. Both lithium ions derived from the lithium salt added to the electrolyte solution and lithium ions fed from the positive electrode 11 as a result of charging may be present in the electrolyte solution.

Others

Although the battery illustrated in FIG. 1, that is, a cylindrical nonaqueous electrolyte secondary battery 10 that includes a cylindrical battery casing, is described in the above exemplary embodiment of the present disclosure, the nonaqueous electrolyte secondary battery according to the present disclosure is not limited to the battery illustrated in FIG. 1. Specifically, the nonaqueous electrolyte secondary battery according to the present disclosure may be, for example, a rectangular battery that includes a rectangular battery casing or a laminated battery that includes a resin package, such as an aluminum lamination sheet. The electrode group included in the nonaqueous electrolyte secondary battery according to the present disclosure is not limited to a wound electrode group. The electrode group included in the nonaqueous electrolyte secondary battery according to the present disclosure may be, for example, a multilayer electrode group that includes a plurality of positive electrodes and a plurality of negative electrodes that are alternately stacked on top of each other with a separator being interposed between each of the pairs of positive electrodes and negative electrodes.

EXAMPLES

Further details of the nonaqueous electrolyte secondary battery according to the present disclosure are described with reference to Examples below. Note that Examples below are merely illustrative but not restrictive of the present disclosure.

Example 1

An Fe foil (2×2 cm) was used as a working electrode. Both surfaces of the Fe foil were plated with Zn, that is, a Zn layer having a thickness of 0.2 μm was deposited on both surfaces of the Fe foil. A lithium metal was used as a counter electrode. The working electrode served as a negative electrode of a nonaqueous electrolyte secondary battery. The counter electrode served as a positive electrode of a nonaqueous electrolyte secondary battery. The Fe foil was doubly covered with a separator "3401" produced by Celgard, LLC. A solution prepared by dissolving $LiPF_6$ in vinylene carbonate (hereinafter, abbreviated as "VC") at a concentration of 0.5 mol/L was used as an electrolyte solution. A test cell of Example 1 was prepared in the above-described manner.

Example 2

A test cell of Example 2 was prepared as in Example 1, except that the $LiPF_6$ concentration in the electrolyte solution was changed to 1.0 mol/L.

Example 3

A test cell of Example 3 was prepared as in Example 1, except that the $LiPF_6$ concentration in the electrolyte solution was changed to 1.5 mol/L.

Example 4

A test cell of Example 4 was prepared as in Example 1, except that the $LiPF_6$ concentration in the electrolyte solution was changed to 2.0 mol/L.

Comparative Example 1

A test cell of Comparative example 1 was prepared as in Example 1, except that fluoroethylene carbonate (hereinafter, abbreviated as "FEC") was used instead of VC and the $LiPF_6$ concentration was changed to 1 mol/L.

Comparative Example 2

A test cell of Comparative example 2 was prepared as in Example 1, except that 2-methyltetrahydrofuran (hereinafter, abbreviated as "2MeTHF") was used instead of VC and the $LiPF_6$ concentration was changed to 1 mol/L.

Comparative Example 3

A test cell of Comparative example 3 was prepared as in Example 1, except that a mixed solvent including ethylene carbonate (hereinafter, abbreviated as "EC") and methyl ethyl carbonate (hereinafter, abbreviated as "MEC") at a volume ratio (EC:MEC) of 1:3 was used instead of VC and the $LiPF_6$ concentration was changed to 1 mol/L.

Comparative Example 4

A test cell of Comparative example 4 was prepared as in Example 1, except that MEC was used instead of VC and the $LiPF_6$ concentration was changed to 1 mol/L.

Comparative Example 5

A test cell of Comparative example 5 was prepared as in Example 1, except that a mixed solvent including EC, MEC, and VC at a volume ratio (EC:MEC:VC) of 1:3:4 was used instead of VC and the $LiPF_6$ concentration was changed to 1 mol/L.

Comparative Example 6

A test cell of Comparative example 6 was prepared as in Example 1, except that a mixed solvent including EC, MEC, and VC at a volume ratio (EC:MEC:VC) of 7:21:12 was used instead of VC and the $LiPF_6$ concentration was changed to 1 mol/L.

Comparative Example 7

A test cell of Comparative example 7 was prepared as in Example 1, except that a mixed solvent including EC, MEC, and VC at a volume ratio (EC:MEC:VC) of 19:57:4 was used instead of VC and the $LiPF_6$ concentration was changed to 1 mol/L.

Comparative Example 8

A test cell of Comparative example 8 was prepared as in Example 1, except that a mixed solvent including propylene carbonate (hereinafter, abbreviated as "PC") and VC at a volume ratio (PC:VC) of 1:1 was used instead of VC and the $LiPF_6$ concentration was changed to 1 mol/L.

Charge-Discharge Cycle Test

Each of the test cells prepared in Examples 1 to 4 and Comparative examples 1 to 8 was subjected to a charge-discharge cycle test in order to determine the cycle characteristics of the test cell. In each cycle, the test cell was charged at a constant current of 30 μA to a voltage of 0 V and subsequently discharged to a voltage of 1 V. Ten cycles of charging and discharging was performed.

Figure 2:
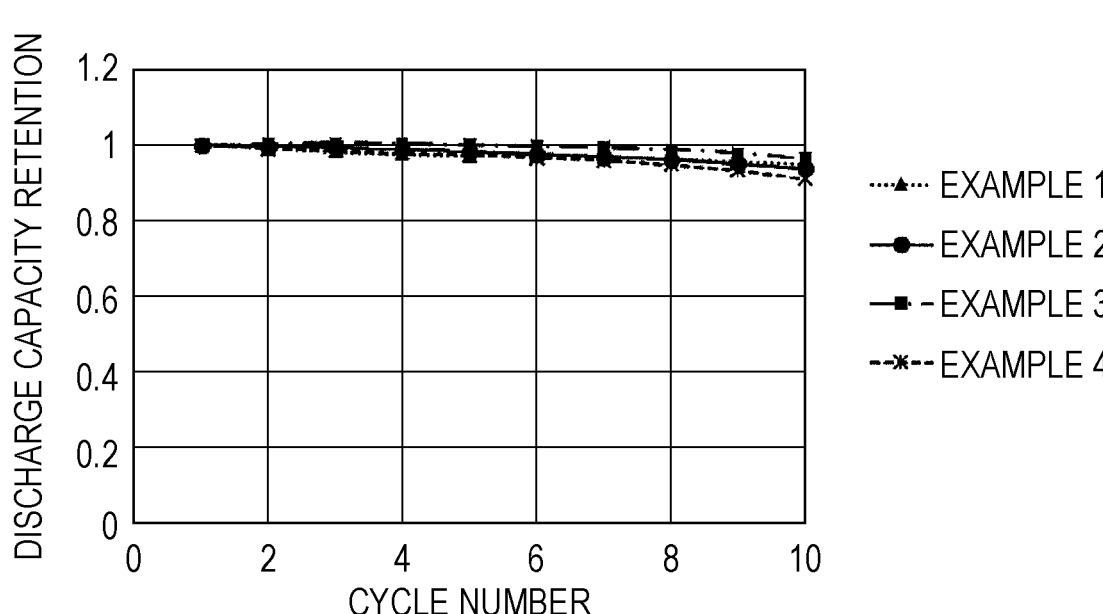
FIG. 2 is a graph illustrating the results of measurement of the discharge capacity retention rates of the nonaqueous electrolyte secondary batteries prepared in Examples 1 to 4.

FIG. 2 is a graph illustrating the discharge capacity retention rates measured in Examples 1 to 4. In FIG. 2, the horizontal and vertical axes show the number of cycles and discharge capacity retention rate, respectively. The discharge capacity retention rate is defined as the ratio of discharge capacity to initial discharge capacity. In other words, the discharge capacity retention rate in the n-th cycle (where n is an integer of equal to or greater than 2) is defined as the ratio of the discharge capacity measured in the n-th cycle to the initial discharge capacity (i.e., the discharge capacity measured in the first cycle). The discharge capacity retention rate can be defined using the following expression:

(Discharge capacity retention rate in $n$-th cycle)= (Discharge capacity in $n$-th cycle)/(Discharge capacity in first cycle (i.e., initial discharge capacity))

The results illustrated in FIG. 2 confirm that the change in the $LiPF_6$ concentration did not greatly affect the discharge capacity retention rate.

Figure 3:
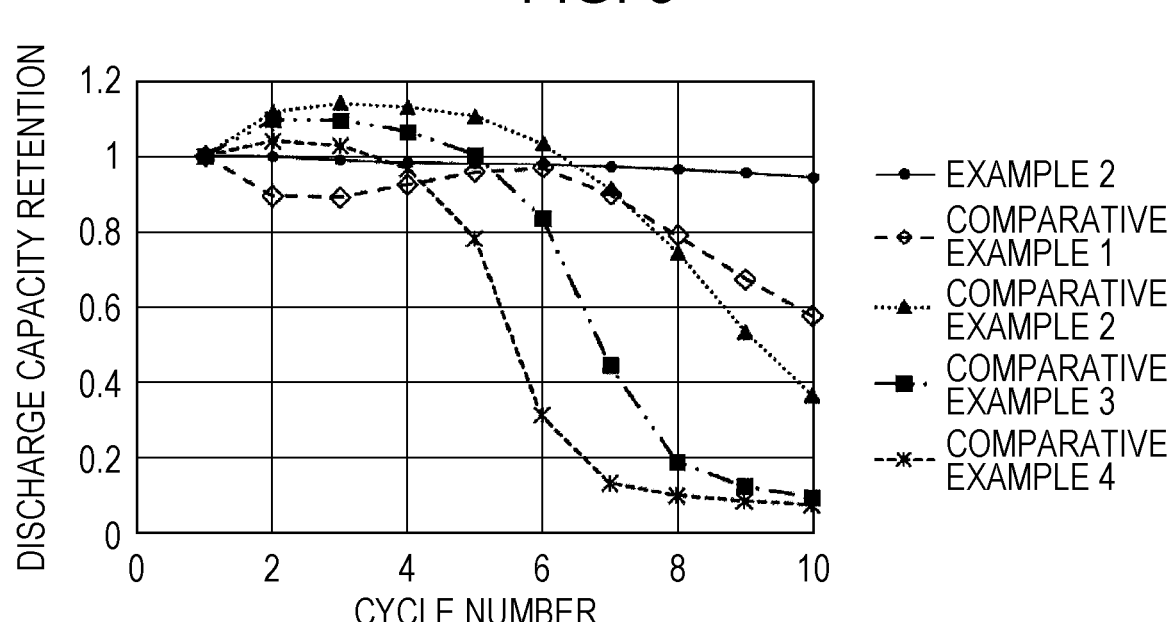
FIG. 3 is a graph illustrating the results of measurement of the discharge capacity retention rates of the nonaqueous electrolyte secondary batteries prepared in Example 2 and Comparative examples 1 to 4.
Figure 4:
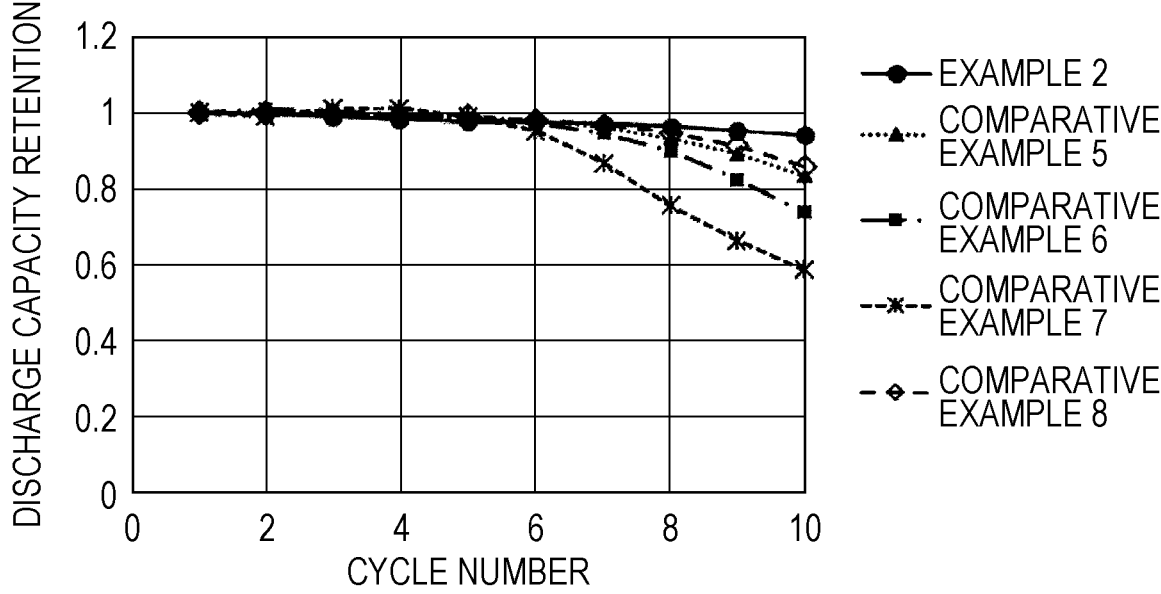
FIG. 4 is a graph illustrating the results of measurement of the discharge capacity retention rates of the nonaqueous electrolyte secondary batteries prepared in Example 2 and Comparative examples 5 to 8.

FIG. 3 is a graph illustrating the discharge capacity retention rates measured in Example 2 and Comparative examples 1 to 4. FIG. 4 is a graph illustrating the discharge capacity retention rates measured in Example 2 and Comparative examples 5 to 8. In FIGS. 3 and 4, the horizontal and vertical axes show the number of cycles and discharge capacity retention rate, respectively.

The results illustrated in FIG. 3 confirm that the discharge capacity retention rate of the cell prepared in Example 2 (i.e., the cell that included only VC as a solvent) did not reduce significantly even after 10 cycles. It is confirmed that the cell prepared in Example 2 had markedly high cycle characteristics compared with the cells prepared in Comparative examples 1 to 4 (i.e., the cells that included a solvent other than VC).

The results illustrated in FIG. 4 confirm that the cell prepared in Example 2 (i.e., the cell that included only VC as a solvent) had markedly high cycle characteristics compared with the cells prepared in Comparative examples 5 to 8 (i.e., the cells that included a mixed solvent including VC and a solvent other than VC).

The above results confirm that the use of a solvent composed only of VC may markedly enhance the cycle characteristics of the nonaqueous electrolyte secondary battery.

By the technique according to the present disclosure, a nonaqueous electrolyte secondary battery having markedly improved cycle characteristics may be provided.

What is claimed is:

1. A nonaqueous electrolyte secondary battery comprising:

a positive electrode capable of occluding and releasing lithium;

a negative electrode including a negative electrode current collector and a negative electrode active material; and an electrolyte solution including vinylene carbonate which is the only solvent in the electrolyte solution and $LiPF_6$ which is the only electrolyte salt in the electrolyte solution, wherein the negative electrode active material is a metal film consisting of metal zinc or an alloy of metal zinc, the metal film is disposed on the negative electrode current collector, and a coating film formed by reductive polymerization of the vinylene carbonate is formed on a surface of the negative electrode.

2. The nonaqueous electrolyte secondary battery according to claim 1, wherein the metal film consists of the metal zinc.

3. The nonaqueous electrolyte secondary battery according to claim 1, wherein the metal film consists of at least one lithium-zinc alloy selected from the group consisting of $Li_2Zn_3$, $LiZn_2$, $LizZn_5$, $LiZn_4$, and LiZn.

4. The nonaqueous electrolyte secondary battery according to claim 1, wherein the metal film consists of the alloy of the metal zinc, and the alloy of the metal zinc includes at least one selected from the group consisting of $Li_2Zn_3$, $LiZn_2$, $LizZn_5$, and $LiZn_4$.

5. The nonaqueous electrolyte secondary battery according to claim 1, wherein the negative electrode current collector is made of iron.

* * * * *